United States Patent [19]

Fay

[11] 4,354,168
[45] Oct. 12, 1982

[54] DELAY LINE CANCELER

[75] Inventor: Victor K. Fay, Sunnyvale, Calif.

[73] Assignee: Itek Corporation, Lexington, Mass.

[21] Appl. No.: 183,914

[22] Filed: Sep. 4, 1980

[51] Int. Cl.³ .................. H01P 1/20; H01P 1/212; H01P 9/00

[52] U.S. Cl. .................. 333/156; 328/165; 333/20; 333/202; 333/206

[58] Field of Search .................. 333/156–163, 333/19, 20, 23, 138–140, 202, 204–209, 245, 246, 248; 307/106–108; 328/56, 59, 62, 165

[56] References Cited

U.S. PATENT DOCUMENTS

3,225,223  12/1965  Martin .................. 307/108
3,416,103  12/1968  Goldsworthy .................. 333/20
3,668,416  6/1972  Marilleau .................. 333/20 X Primary Examiner—Marvin L. Nussbaum
Attorney, Agent, or Firm—Homer O. Blair; Robert L. Nathans; Gerald H. Glanzman

[57] ABSTRACT

A source of pulse waves is coupled to a first transmission line and a second transmission line, the inputs of each line being parallely coupled. The input of the first line is in series with its characteristic impedance. The outputs of each line are series coupled for summation of the output voltage of each line. The first line develops a voltage having a opposite polarity of the voltage of the applied signals. Summation of the output voltages of the two lines effects the required cancellation for pulse waves having a pulse width larger than the difference between the time delay of each line. A device for utilizing the pulses is connected between one output of the first transmission delay line the grounded output of the second transmission line.

8 Claims, 7 Drawing Figures

DELAY LINE CANCELER

BACKGROUND OF THE INVENTION

The present invention relates generally to pulse wave receiver systems, and more particularly to a delay line canceler for filtering long pulse and continuous wave signals from being applied to a receiver designed for short pulse signal reception.

In pulse wave receivers it is often desirable to eliminate the effect of continuous wave (CW) signals, slowly changing phenomena such as clutter, and long pulse signals, such as pulsed Doppler signals, in receivers designed for short pulse signal reception. To eliminate these effects delay line cancelers are used to filter the unwanted signals from the signal source.

Dealy line cancelers work on the delay and substract principle as explained in Skolnick, "Introduction to Radar Systems," (1962) published by McGraw-Hill. Generally, a pulse wave signal is divided along separate transmission paths, the first path being a common transmission line and the second path being a delay line having a characteristic delay constant. The outputs of each path are then coupled to a differential amplifier, the first path coupled to the non-inverting input and the second path to the inverting input. For CW signals and pulse wave signals having a pulse width greater than the delay constant, the pulse wave signal will appear at each input to the differential amplifier. The differential amplifier is operative to subtract the voltage of the signal applied at its inverting input from the voltage of the signal applied to the non-inverting input. Since both voltages are equal, the differential amplifier will develop an output signal having zero voltage, effecting cancellation of the undesired signals. A typical delay line canceler as hereinabove described has been disclosed in an application entitled "Delay Line Cancellation Pulse Detector", Ser. No. 119,706, filed on Feb. 8 1980, and assigned to the assignee of the present invention.

The differential amplifier, being an active element present in the prior art delay line canceler, introduces temperature sensitivity into the pulse wave receiver system. This limitation arises from the temperature dependent common mode rejection of the differential amplifier inputs. Furthermore, the transmission line must be resistively tuned to the characteristic impedance of the delay line, which also is temperature dependent, for providing equal voltage at the inputs to the differential amplifier. These limitations limit the achievable suppression of undesired signals to about 40 db within a temperature range of $-55°$ C. to $95°$ C.

A prior art delay line canceler as hereinabove described operates in frequency bands normally below 5.00 MHz. Circuit design techniques which rely on active elements introduce another limitation as the high cost of design or purchase of a microwave amplifier designed for the contemplated frequencies.

SUMMARY OF THE INVENTION

It is an important object of the present invention to provide a delay line canceler which is less sensitive to changes in ambient temperature than known delay line cancelers in common use today.

It is a further object of the present invention to provide a delay line canceler which does not rely on active elements to effect cancellation of undesired signals, and therefore be further independent of temperature.

It is still a further object of the present invention to provide a delay line canceler which is simpler in design, construction and maintenance and achieves greater suppression of undesired signals than known cancelers.

According to the invention, a delay line canceler comprises a first transmission line for application of pulse signals and for developing a first output voltage having the opposite polarity as the voltage of the applied signals; the first line being coupled in series with an impedance, and a second transmission for application of the pulse signals for developing a second output voltage having the same polarity of the applied signals. The outputs of the first and second transmission lines are coupled in series for effecting summation of the first and second output voltages.

BRIEF DESCRIPTION OF THE DRAWINGS

FIG. 3b shows an equivalent discrete circuit diagram of the delay line canceler of FIG. 3a.

DETAILED DESCRIPTION OF THE PREFERRED EMBODIMENT

Figure 1:
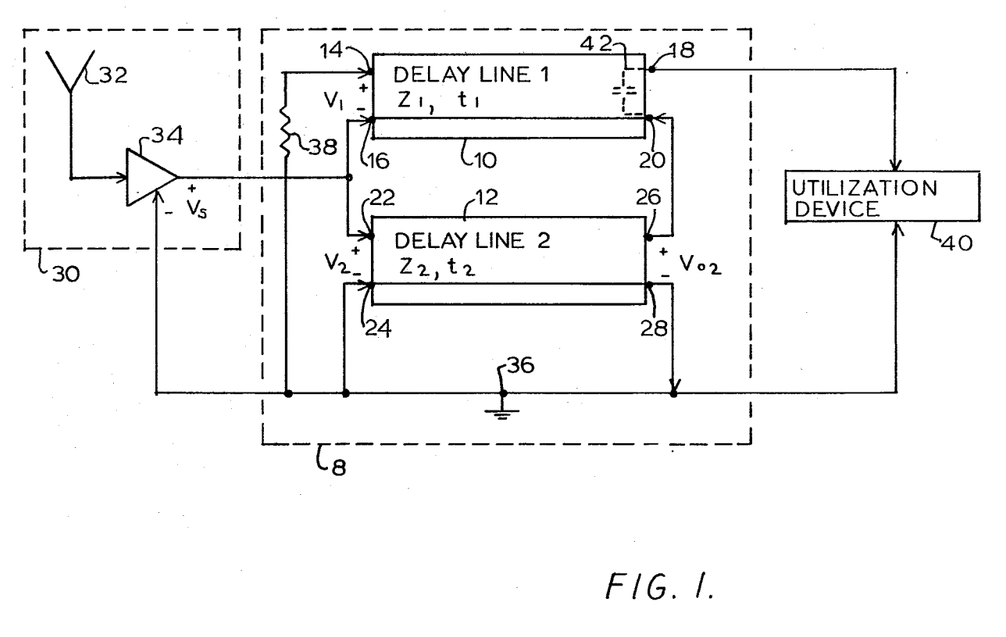
FIG. 1 shows a schematic block diagram of a delay line canceler according to the principles of the present invention.

FIG. 1 shows a delay line canceler 8 constructed in accordance with the principles of the present invention. Delay line canceler 8 comprises a first transmission line 10 and a second transmission line 12. First transmission line 10 includes a first input terminal 14, a second input terminal 16, a first output terminal 18 and a second output terminal 20. Second transmission line 12 includes a first input terminal 22, a second input terminal 24, a first output terminal 26 and a second output terminal 28. Each line 10 and 12 has a characteristic impedance and a characteristic time delay, hereinafter referred to as $Z_1$, $t_1$, and $Z_2$, $t_2$, respectively.

A source of signals 30 provides both undesired continuous wave (CW) signals and long pulse signals such as pulsed Doppler signals, as well as desired short pulse signals. For purposes of this specification, a short pulse signal is any pulse signal having a time domain pulse width less than the difference between the time delay exhibited by line 10 minus the delay exhibited by line 12, given by $t_1-t_2$. In a preferred embodiment of the present invention, it is contemplated that the above-described signals, hereinafter generally referred to as the pulse signals, are carried by microwave carrier signals and source 10 includes an antenna 32 selected for reception of the carrier signals and a demodulator/amplifier 34 selected to demodulate the carrier signal and apply the pulse signals to delay line canceler 8. A common ground 36 is provided between delay line canceler 8 and source 30.

Source 30 applies the pulse signals having a voltage $V_s$ to delay line canceler 8 and more particularly to input terminal 16 of first transmission line 10 and to input terminal 22 of second transmission line 12. An impedance 38 is coupled to input terminal 14 and ground 36, and input terminal 24 is also coupled to ground 36. Application of the pulse signals at input terminal 16 develops a first wave signal having a voltage $V_1$ travelling along line 10 towards its output terminals 18 and 20. In a preferred embodiment of the present invention, impedance 38 is identical to $Z_1$, and from Kirchoff's Laws the voltage of the first wave signal has the opposite polarity and one-half the amplitude of the pulse signals applied to input terminal 16, or $V_1 = -\frac{1}{2}V_s$. Application of the pulse signals at input 22 develops a second wave signal having a voltage $V_2$ travelling along line 12 towards its output terminals 26 and 28. The voltage of the second wave signal has the same polarity and amplitude of the pulse signals applied to input terminal 22, or $V_2 = V_s$.

Output terminal 20 of first transmission line 10 is coupled to output terminal 26 of second tranmission line 12 for summing the output voltages of lines 10 and 12. Output terminal 28 is coupled to ground 36. The output of delay line canceler 8 is provided between output terminal 18 of line 10 and ground 36. A device 40 for utilizing the output of delay line canceler 8 is coupled to output terminal 18 and ground 36. In a preferred embodiment of the present invention, the input impedance of device 40, hereinafter referred to as $Z_L$, is equal to the impedance of line 12 less the impedance of line 10, or $Z_L = Z_2 - Z_1$.

The second wave signal will appear at the output of line 12 after time $t_2$ has elapsed. The coupling of output terminal 26 to output terminal 20 effects a series coupling of lines 10 and 12. The load impedance coupled to second line 12 will be equal to $Z_1 + Z_L$. For the preferred $Z_L$ hereinabove, the load impedance reduces to $Z_2$. The perfect termination of second line 12 by a load impedance equal to $Z_2$ will not reflect the second wave signal at the output of line 12 and the output voltage, hereinafter referred to as $V_{02}$, developed at output terminal 26 with respect to grounded output terminal 28 is equal to $V_2$, or as hereinabove described, equal to $V_s$. Thus, second line 12 develops an output voltage having the same polarity of the voltage of the applied pulse signals.

The first wave signal will appear at the output of line 10 after time $t_1$ has elapsed. The load impedance coupled to the first line 10 will be equal to $Z_2 + Z_L$ which, in the preferred embodiment hereinabove described, reduces to $2Z_2$. A further preferred condition is that $Z_1$ be much less than $Z_2$. The termination of line 10 by $2Z_2$ will totally reflect the first wave signal at the output of line 10 and the output voltage, hereinafter referred to as $V_{01}$, developed at output terminal 18 with respect to output terminal 20 is equal to twice $V_1$, or as hereinabove described, equal to $-V_s$. This first line 10 develops an output voltage having the opposite polarity of the voltage of the applied uplse signals. The reflected first wave signal will return to the input of line 10 which is terminated by impedance 38 and source 30. In the preferred embodiment of the present invention, impedance 38 is equal to $Z_1$ and the output impedance of source 30 is equal to zero to four ohms, being much less than $Z_1$. The preferred input termination of line 10 will be a perfect termination and the reflected first wave will be dissipated through impedance 38.

In a preferred embodiment of the present invention, the time delay $t_1$ of first line 10 is greater than the time delay $t_2$ of second line 12. A short pulse signal having a pulse width less than $t_1 - t_2$ when applied to delay line canceler 8 will appear after time $t_2$ as $V_{02} = V_s$ and be applied to device 40. The inherent distributed capacitance, shown as capacitor 42, within first line 10 coupled the output terminal 26 to device 40. A long pulse signal having a pulse width larger than $t_1 - t_2$ when applied to delay line canceler 8 will first appear after time $t_2$ as $V_{02} = V_s$. At time $t_1$, the long pulse will also appear as $V_{01} = -V_s$. Thus, for a long pulse from time $t_2$ to $t_1$, the output of delay line cancellor 8 will be equal to $V_s$. After time $t_1$, the output of delay line canceler 8 equals zero.

In a preferred embodiment of the present invention, first transmission line 10 has a characteristic delay time of $t_1 = 300$ ns and a characteristic impedance of $Z_1 = 200$ ohm. A preferred transmission line 10 is delay line Model L2140 manufactured by Data Delay Inc. Second line 12 need not be any specific device but any transmission line means preferrably having a characteristic delay time of $t_2 = 0$ and a characteristic impedance of at least $100Z_1$. Second line 12 may be realized as a parallel pair transmission line exhibiting the preferred $t_2$ and $Z_2$. Hereinafter $t_1$ is referred to as the delay constant which implies $t_1$ is much greater than $t_2$.

Figure 2A:
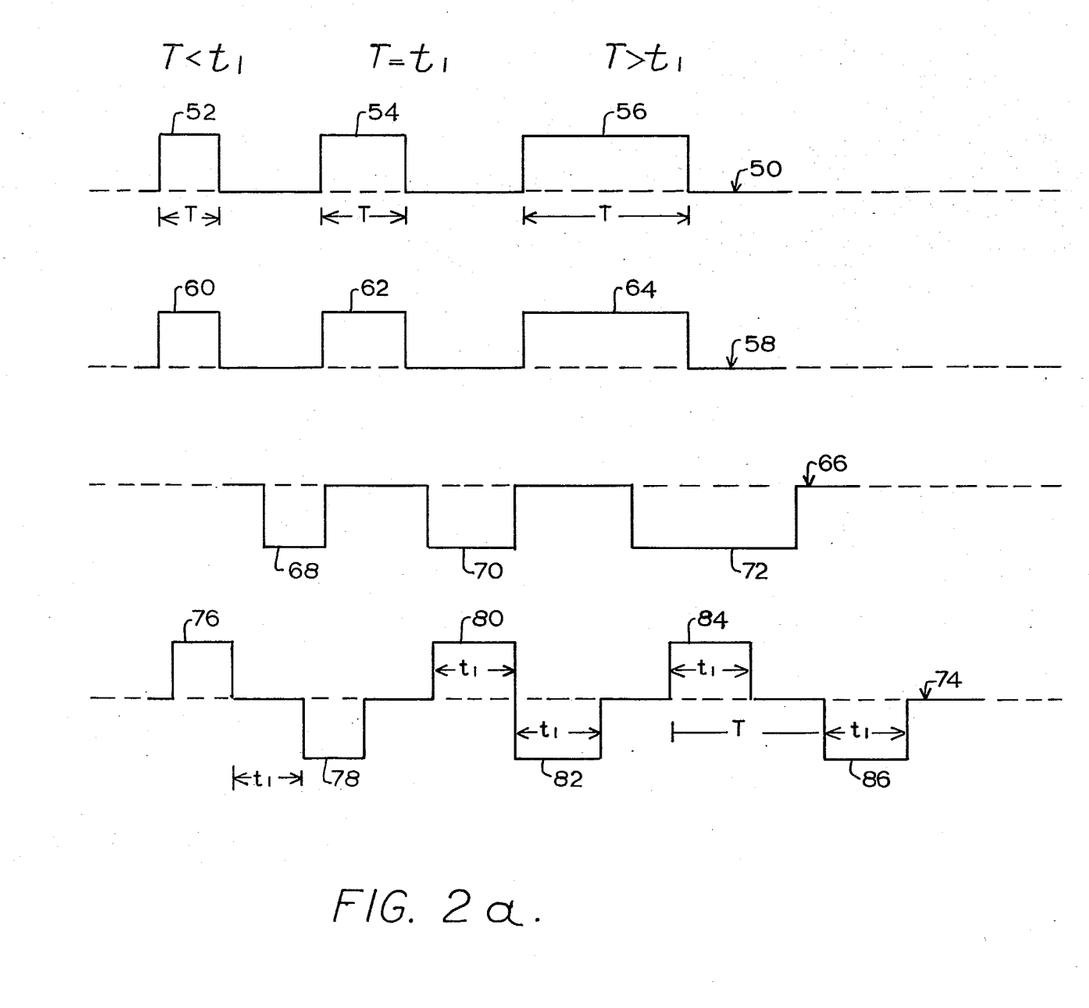
FIG. 2a shows a time domain representation of the input and output signals applied to and developed by the delay line canceler of FIG. 1.

FIG. 2a shows a time domain input representation 50 of pulse signals including a first pulse 52 having a pulse width less than the delay constant (short pulse) of first line 10 (FIG. 1), a second pulse 54 having a pulse width equal to the aforementioned delay constant and a third pulse 56 having a pulse width larger than the aforementioned delay constant. A first time domain output representation 58 shows the output voltage of second line 12 (FIG. 1) when the pulse signals of representation 50 are developed by source 30 (FIG. 1), and applied to delay line canceler 8. A first output pulse 60, a second output pulse 62 and a third output pulse 64 represent the output voltage developed at output terminal 26 (FIG. 1) corresponding to the hereinabove described application of pulses 52, 54 and 56, respectively. A second time domain output representation 66 shows the output voltage of first line 10 when the pulse signals of representation 50 are applied as hereinabove described. A fourth output pulse 68, a fifth output pulse 70 and a sixth output pulse 72 represent the output voltage developed at output terminal 18 (FIG. 1) corresponding to the hereinabove described application of pulses 52, 54 and 56, respectively.

A third time domain output representation 74 shows the sum of the hereinabove described representations 58 and 66. A first positive pulse 76 and a first negative pulse 78 represent the output voltage applied to utilization device 40 (FIG. 1) when pulse 52 is applied to delay line canceler 8. A second positive pulse 80 and a second negative pulse 82 represent the output voltage applied to device 40 when pulse 54 is applied to delay line canceler 8. A third positive pulse 84 and a third negative pulse 86 represent the voltage applied to device 40 when pulse 56 is applied to delay line canceler 8. Pulses 76 and 80 show that pulse signals having a pulse width less than or equal to the delay constant represented by pulse 52 and 54 when applied to delay line canceler 8 are developed at its output and applied to device 40 without cancellation. Pulse 84 shows that pulse signals having a pulse width larger than the delay constant represented by pulse 56 when applied to delay line canceler 8 is developed at its output only for a period of time equal to the delay constant, the time required for the voltage of the applied pulse to be developed at output terminal 18. Preferably, device 40 includes a half wave rectifier at its input rendering pulses 78, 82 and 86, occurring because of the delayed output of delay line 10, extraneous in the output of coupler 38.

Figure 2B:
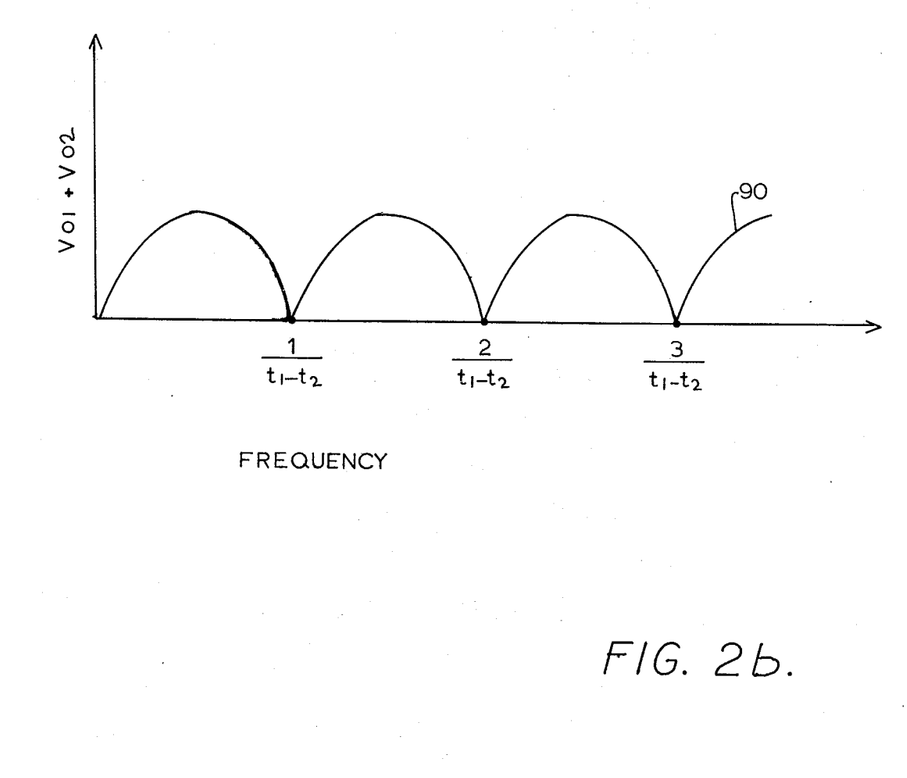
FIG. 2b shows a frequency domain representation of the output signals developed by the delay line canceler of FIG. 1.

FIG. 2b shows a frequency domain output representation 90 of the output signals developed by delay line canceler 8 (FIG. 1). Representation 90 indicates that the hereinabove delay line canceler 8 can also be used as a periodic notch filter. When a signal developed by source 30 has a frequency equal to integer multiples of $1/(t_1 - t_2)$ and is applied to delay line canceler 8 as hereinabove described, the signals appearing at the outputs of transmission lines 10 and 12 (FIG. 1) will be in phase and cancel as hereinabove described. For all other frequencies, the outputs of lines 10 and 12 will not be in phase and not be cancelled. The description of the operation of delay line canceler 8 in the frequency domain is identical to the hereinabove time domain description. The frequency domain output representation 90 is sinusoidal.

Returning to FIG. 1, second tranmission line 12 may be a length of standard transmission line having the hereinabove described impedance and delay time. In a preferred embodiment of the present invention, second transmission line 12 may also be realized as the distributed stray inductance which exists between terminals 16 and 20 of line 10 and the distributed stray capacitance which exists from the distributed inductance to the circuit ground 36.

Figure 3A:
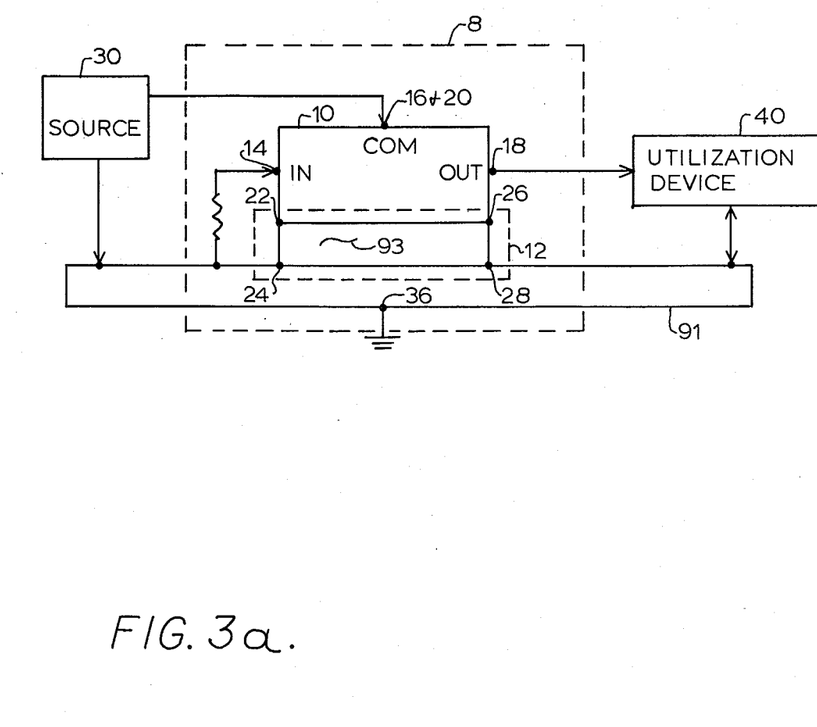
FIG. 3a shows a preferred embodiment of the delay line canceler of FIG. 1.

FIG. 3a shows a preferred embodiment of the delay line canceler 8, for video applications up to 200 MHz. The first transmission line 10 is the hereinabove described L2140 delay line. A conductive member 91 is connected to ground 36 and becomes the ground plane. A dielectric pad 93 is provided for mounting delay line 10 thereon and insulating it from member 91. By applying the pulse signals to the input terminal 16, indicated as the common or COM terminal of delay line 10, an electromagnetic field is developed between the outer surface of delay line 10 and member 91 through pad 93. Pad 93 acts as the wave medium for second transmission line 12 for developing the hereinabove second wave. The wave medium may be modelled as the distributive inductance along the outer surface of delay line 10 and the distributive capacitance from the upper surface of pad 93 to which delay line 10 is mounted to the lower surface of pad 93 mounted to member 91. The remaining elements and connections shown in FIG. 3a operate in accordance with the similarly numbered elements and connections described in reference to FIG. 1.

Figure 3B:
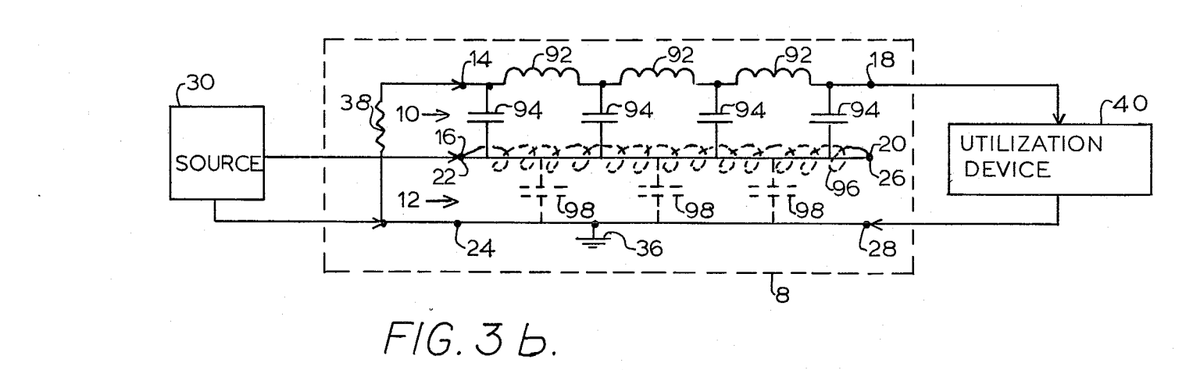

FIG. 3b shows an equivalent discrete circuit diagram of the delay line canceler 8 of FIG. 3a wherein second transmission line 12 is realized as the hereinabove described stray inductance and capacitance. First transmission line 10 includes a plurality of inductors 92 and a plurality of capacitors 94, selected for achieving the hereinabove described preferred impedance and time delay. Second transmission line 12 includes the distributed inductance 96 between input terminals 16 and 20 and the distributed capacitance 98 between transmission line 10 and ground 36. Ground 36 may be the ground plane of a printed circuit board and inductance 96 may exist along a bus bar thereon. The length of the bus bar and its separation from the ground plane are selected for achieving the hereinabove described preferred impedance and time delay of line 12. The remaining elements and connections shown in FIG. 3b and further Figures operate in accordance with the similarly numbered elements and connections described in reference to FIG. 1. Of course, line 10 may also be the hereinabove described L2140 delay line.

Figure 4:
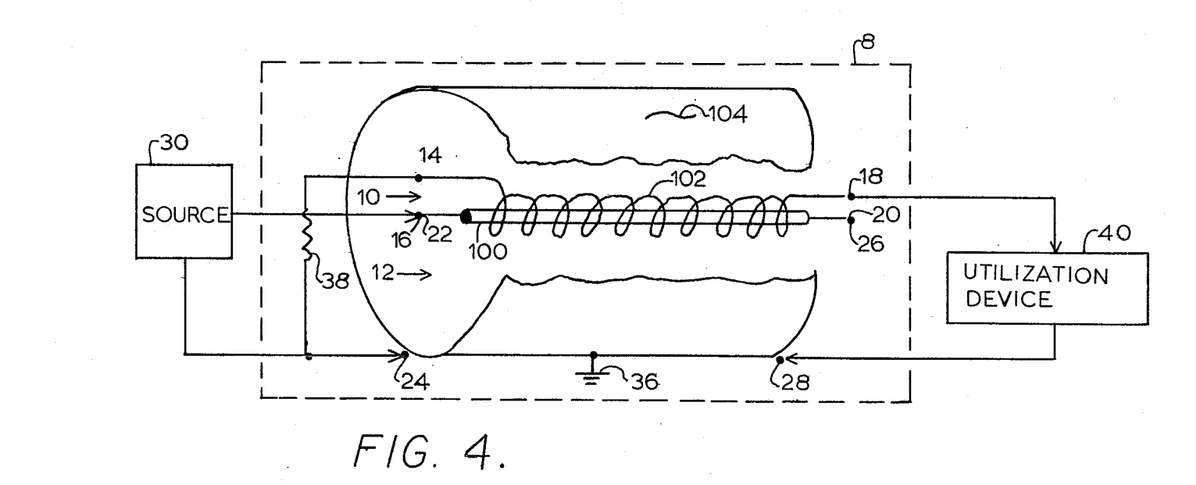
FIGS. 4 and 5 show alternate embodiments of the delay line canceler of FIG. 1.

FIG. 4 shows another embodiment of delay line canceler 8 which may be used for high frequency (RF) applications up to 3 GHz. First transmission line 10 includes a conductive element 100, such as an ordinary wire, and an inductive strand 102 wound about element 100. Second transmission line 12 includes a conductive element 100 and a cylindrical shielding element 104. The number of loops of inductive strand 102 around conductive element 100, the radius of the loops centered about conductive element 100, and the length of conductive element 100 is chosen according to well known electromagnetic field principles to achieve the hereinabove described preferred impedance and time delay of first transmission line 10. Similarly, the radius and length of ground shield 104 is chosen to achieve the hereinabove described preferred impedance and time delay of second transmission line 12.

Figure 5:
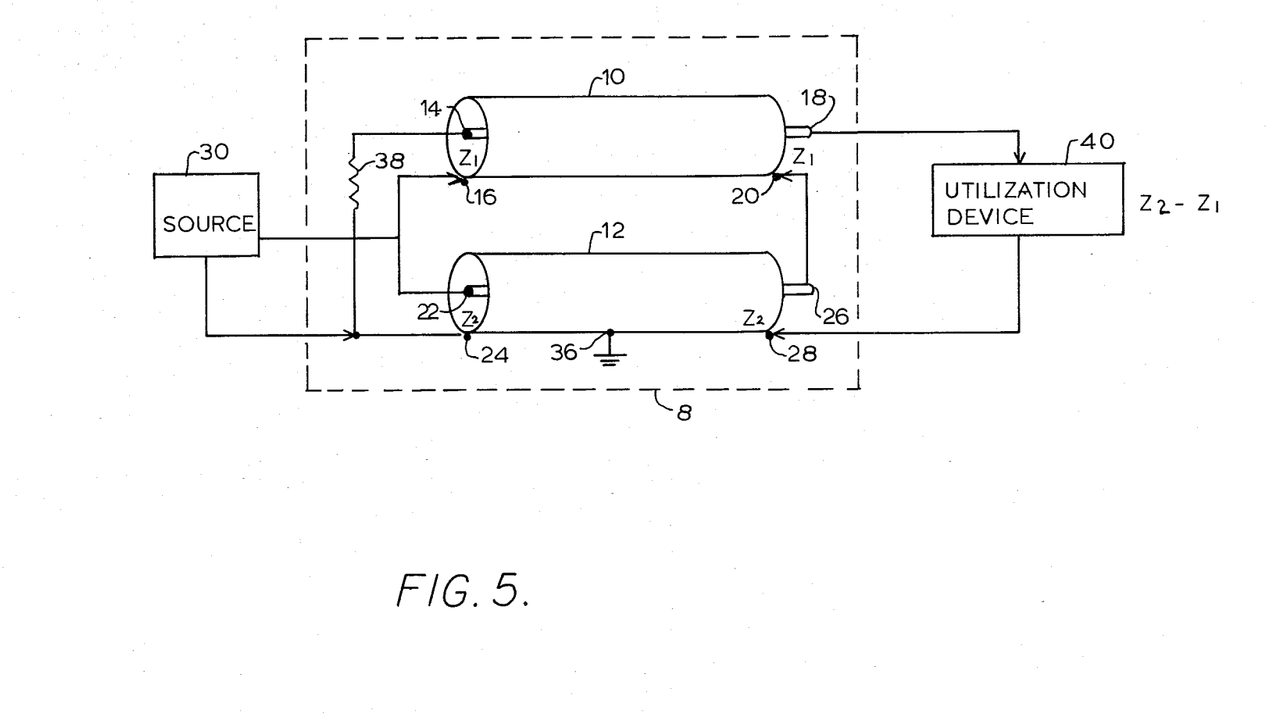

FIG. 5 shows still another embodiment of delay line canceler 8 which may also be used for RF frequencies. Transmission lines 10 and 12 are separate lengths of coaxial cable selected to achieve the hereinabove described preferred impedance and time delay. The signals from source 30 are applied to the outer conductor of line 10 shown as input terminal 16 and the inner conductor of line 12 shown as input terminal 22. Input terminal 21 and output terminal 28 are grounded by coupling the outer conductor of second transmission line 12 to ground 36. Impedance 38 is coupled to the inner conductor of first transmission line 10 shown as input terminal 14, and coupled to ground 36. The other end of the inner conductor of second transmission line 12 shown as output terminal 26 is coupled to the outer conductor of first transmission line 10 shown at output terminal 20. The other end of the inner conductor of first transmission line 10 shown as output terminal 18 is coupled to device 40. Source 30 and device 40 are further coupled to ground 36 through input terminal 24 and output terminal 28, respectively.

Although the invention has been described with a certain degree of particularity, it is understood that the present disclosure has been made only by way of example and that numerous changes in the details of construction and the combination and arrangement of parts in the mode of operation may be made without departing from the spirit and the scope of the invention as hereinafter claimed.

What is claimed is:

1. A delay line canceler for coupling a source of pulse signals to a device for utilizing the pulse signals and for converting all pulse signals having a time domain pulse width in excess of a selected pulse width to a pulse signal having the selected pulse width, and said delay line canceler comprising:

first transmission line means including a first input terminal coupled to the source for application of the pulse signals and for developing a first wave signal along said first transmission line means, a second input terminal, impedance means for coupling said second input terminal to ground, a first output terminal, and a second output terminal coupled to the device;

second transmission line means including a third input terminal coupled to the source for application of the pulse signals and for developing a second wave signal along said second transmission line means, a fourth input terminal coupled to ground, a third output terminal coupled to said first output terminal for summing the outputs of said first and said second transmission line means, and a fourth output terminal coupled to ground, said third output terminal being responsive to said second wave signal for developing a voltage with respect to said fourth output terminal having the same polarity as the voltage of the pulse signals applied to said third input terminal, said second output terminal being responsive to said first wave signal for developing a voltage with respect to said first output terminal having the opposite polarity as the voltage of the pulse signals applied to said first input terminal.

2. A delay line canceler in accordance with claim 1 wherein said first transmission line means has a first characteristic time delay and said second transmission line means has a second characteristic time delay, the difference between said first time delay and said second time delay being commonsurate with the selected pulse width.

3. A delay line canceler in accordance with claim 2 wherein said first transmission line means has a first characteristic impedance and wherein said second transmission line means has a second characteristic impedance being at least two orders of magnitude greater than said first characteristic impedance.

4. A delay line canceler as recited in claim 1 wherein said canceler has comb filter frequency characteristics having means for filtering out D.C. and all time periodic signals which are an integer multiple of $1/(t_1-t_2)$, wherein $t_1$ equals the characteristic time delay of said first transmission line means and $t_2$ equals the characteristic time delay of said second transmission line means.

5. A delay line canceler for coupling a source of time periodic signals to a device for utilizing the time periodic signals and for filtering all time periodic signals having a frequency being an integer multiple of a selected frequency, said delay line canceler comprising:
   first transmission line means including a first input terminal coupled to the source for application of the time periodic signals and for developing a first wave signal along said first transmission line means, a second input terminal, impedance means for coupling said second input terminal to ground, a first output terminal, and a second output terminal coupled to the device;
   second transmission line means including a third input terminal coupled to the source for application of the time periodic signals and for developing a second wave signal along said second transmission line means, a fourth input terminal coupled to ground, a third output terminal coupled to said first output terminal for summing the outputs of said first and said second transmission line means, and a fourth output terminal coupled to ground, said third output terminal being responsive to said second wave signal for developing a voltage with respect to said fourth output terminal having the same polarity as the voltage of the time periodic signals applied to said third input terminal, said second output terminal being responsive to said first wave signal for developing a voltage with respect to said first output terminal having the opposite polarity as the voltage of the time periodic signals applied to said first input terminal.

6. A delay line canceler in accordance with claim 5 wherein said second transmission line means has a characteristic impedance which is at least two orders of magnitude greater than the characteristic impedance of said first transmission line means.

7. A delay line canceler for coupling a source of pulse signals to a device for utilizing the pulse signals and for converting all pulse signals having a time domain pulse width in excess of a selected pulse width to a pulse signal having the selected pulse width, said delay line canceler comprising:
   a delay line having a characteristic impedance of $Z_1$ and a characteristic time delay of $t_1$, said delay line including an input terminal, and output terminal, and a common terminal;
   a conductive member, said delay line and said conductive member being mounted in relation to one another to form a transmission line having a characteristic impedance which is at least two orders of magnitude greater than $Z_1$ and a characteristic time delay of $t_2$;
   a resistive impedance, having an impedance substantially equal to $Z_1$, coupling said input terminal to said conductive member; and
   means for coupling the source of pulse signals between said common terminal and said conductive member and the device for utilizing the pulse signals between said output terminal and said conductive member.

8. The delay line canceler in accordance with claim 7 wherein the difference between $t_1$ and $t_2$ is substantially equal to the selected pulse width.

* * * * *